United States Patent Office

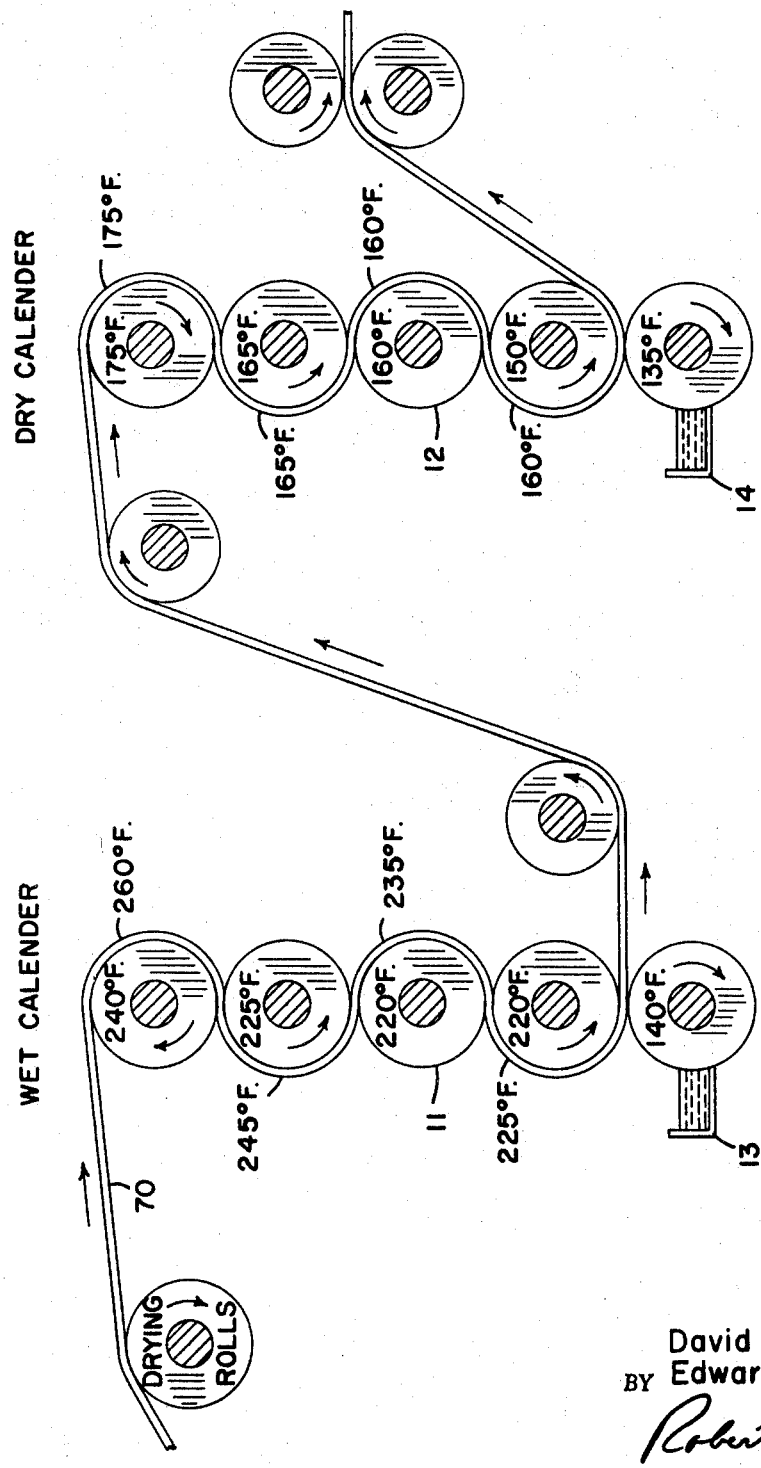

3,389,042
Patented June 18, 1968

3,389,042
GYPSUM WALLBOARD AND METHOD FOR PRODUCING SAME
David Bieri, Tonawanda, and Edward S. Coia, Kenmore, N.Y., assignors to National Gypsum Company, Buffalo, N.Y., a corporation of Delaware
Continuation-in-part of application Ser. No. 344,582, Feb. 13, 1964. This application Jan. 21, 1966, Ser. No. 522,094
18 Claims. (Cl. 161—41)

ABSTRACT OF THE DISCLOSURE

A paper-covered, gypsum core wallboard made of cover paper having therein, or thereon, a cured hydrophobic organo-silicone, which reduces the absorption by the paper of components of the wet gypsum slurry, without affecting substantially the paper porosity, and, of prime importance, without any deleterious effect on the bond of the paper to the gypsum core, either prior to the drying of the board or after the drying of the board.

---

This application is a continuation-in-part of our co-pending application entitled "Gypsum Wallboard" bearing Ser. No. 344,582 and filed Feb. 13, 1964, now abandoned.

This invention relates to an improved gypsum board, and to the new and unobvious method of making the improved gypsum board.

Gypsum wallboard is manufactured, for example, in what might be thought of as two steps or operations. First, there is manufactured a paper cover sheet, generally a multiply sheet manufactured on a cylinder machine in which a cylindrical screen rotates in a vat containing an aqueous slurry of paper furnish. Conventional sizing compounds such as rosin and alum are added to the selected vat to properly size some or all plies. Various numbers of plies after being formed on the screen, are removed therefrom and are superimposed to form an essentially unitary piece of paper, typically of about 0.020 inch thick.

In the gypsum board plant, as a second step, an aqueous slurry of settable gypsum plaster, having more than sufficient water for hydration and setting of the gypsum, is spread on the advancing paper cover sheet and a second paper cover sheet is continuously applied on top of the gypsum as the unset, wet board is moved through the forming apparatus. The partially hardened, endless board is then cut into desired lengths and passed into a high temperature drying kiln.

The paper ply of the multi-ply cover sheet directly adjacent the plaster core is known as the bond ply or core-side ply. This ply, and the filler plies intermediate the bond ply and the outermost ply or top liner ply, are commonly formed from a mixture of waste paper pulps. The bond ply, top liner ply and filler plies may be made of substantially the same or different paper furnish. For example, the bond ply and filler plies formed from a mixture of waste paper pulps can be employed in the manufacture of the paper cover sheet. Where an attractive outermost ply is required, such as creamface, it may be made from groundwood and sulfite or other type of suitable pulp.

Generally, the paper cover sheets used in gypsum wallboard range in thickness from about 0.010 to 0.030 inch, and preferably 0.016 to 0.023 inch, and have tensile strengths in the machine direction of about 50–115 lbs./in. and in the across-machine direction within the range of about 15–40 lbs./in.

It is necessary to have a strong bond between the gypsum core and the paper cover sheet in the finished board to prevent separation or delamination of the paper from the core. Separation can occur either in the form of "film peeling" in which a thin layer of the core is removed along with the paper and adheres thereto, or a "clean peel" in which the paper is cleanly separated from the gypsum core.

Generally, it has been considered necessary to provide for absorption of water from the gypsum slurry into at least the bond ply of the multi-ply paper covering sheet. The water absorption mechanism carries some dissolved gypsum into the paper where the gypsum crystallizes and provides a resultant mechanical linking of the paper to the gypsum core. This absorption of water by the paper, however, decreases the ratio of water to unset gypsum in a very thin layer of the gypsum core immediately adjacent the paper cover sheet, particularly during initial setting of the gypsum core, when the ratio of water to gypsum is critical to obtain the desired quality of set gypsum throughout the core. In the thin layer of unset gypsum having a relatively lower water ratio, a different crystal growth occurs from that throughout the balance of the core, creating what is termed stratification. Stratification becomes increasingly apparent with efforts to accelerate the setting of the gypsum, or to decrease the drying time in the kiln. Also, gypsum manufactured from ores of relatively low purity may aggravate the problem.

As the degree of stratification increases, the tendency of the thin layer of gypsum to become recalcined during drying in the kiln increases. Accordingly, stratification creates a limiting factor in the drying speed and thus in the overall production rate for a manufacturing facility. If the two stratified layers of gypsum adjacent the two paper cover sheets become recalcined during drying, the integrity and strength of the core at these layers is reduced permitting the cover sheets to be susceptible to so-called "film peeling" which is manifested by separation of the paper from the core with a thin layer of the core adhering to the paper.

The tendency toward recalcination of the stratified layers of gypsum can be lessened, for example, by adding a small percentage of starch, or other suitable water-retention agent, to the gypsum mix used to form the core. The starch migrates toward, and partially into, the paper during the drying and, by its hydrophilic nature, tends to retain water wherever the starch becomes concentrated, including generally the interface zone where the stratification occurs. The greater portion of the starch, however, migrates into the paper because of the absorptiveness of the paper. Where a loss of starch from the gypsum core to the paper occurs, another type of paper-core separation, known as "clean peel," occurs wherein the paper cleanly separates from the core with substantially no core particles clinging to it. For sufficient protection against recalcination in the zone of stratification and to compensate for starch loss, a larger amount of starch is generally necessary than would be necessary if the starch could be concentrated in the outermost zone of the gypsum core.

The additional amounts of starch required in a core formulation, as above stated, and the absorptivity of the paper cover sheet necessitate greater portions of water in forming the core, thus increasing the amount of drying ultimately required and deleteriously affecting the rate at which the board can be manufactured with given drying facilities.

In addition to the problems of separation or delamination at the interface between the gypsum core and the cover sheets, the multi-ply paper cover sheets are also subject to intra-ply separation and/or delamination of each of the plies from the other during the board-drying operation. Various techniques have been utilized to obviate delamination of the plies, such as the inclusion of wet strength resins in the paper cover sheet. Aminoplastic resins such as melamine-formaldehyde or urea-formaldehyde resins are commonly employed, and the resins are preferably added during the paper-making stage of the gypsum board manufacturing operation. While the use of aminoplastic resins for imparting wet strength to the paper plies minimizes delamination of the paper plies, this is an added expense in the cost of manufacture.

In further investigations of the problems of stratification, recalcination and delamination, the face of the paper cover sheet in contact with the gypsum core was treated with a suitable material which would make it highly repellant to water, or more specifically non-absorptive, without substantially decreasing the normal porosity of the paper. Suitable materials which effect this objective and treating techniques are described in copending United States application Ser. No. 833,281, filed Aug. 12, 1959, by David Bieri, now Patent No. 3,307,987.

In accordance with our invention, it now has been found that the bond between the paper cover sheet and the gypsum core is unexpectedly strengthened and the problems of stratification, recalcination and delamination minimized are avoided by treating the paper cover sheet with a curable hydrophobic organosilicone. As an additional advantage, gypsum board made in accordance with our invention requires less starch than normally employed, and reduces the amount of conventional sizing such as with rosin and alum, that is normally required. In addition, the invention facilitates drying of the gypsum board and provides a gypsum board having an excellent bond between the paper cover sheet and the gypsum core such that substantially all board has what is referred to in the trade as 100% bond; that is, the paper to the core bond is at least as strong as the cohesive strength of either the core or the paper by themselves. Still further, this invention minimizes or inhibits delamination of the paper plies during the board-drying operation thereby obviating or lessening the need of the aminoplastic wet strength resins in the paper cover sheet. Where desired, however, a suitable wet strength resin may be incorporated with the paper cover sheet which is also treated with a curable hydrophobic silicone, but the amount of wet strength resin used is reduced substantially from that required in the absence of the treatment according to this invention.

According to the present invention, the paper cover sheet is treated with a curable hydrophobic organo-silicone, and more preferably a curable hydrophobic silicone selected from the group consisting of organohydrogensiloxane, epoxy silicone, and the addition product of a hydrosilicone with a fatty acid ester. The silicone compositions are more fully described infra.

The amount of curable hydrophobic silicone required to minimize or inhibit stratification will vary with variations in paper and gypsum composition. The inhibition of stratification to be achieved when a paper is used that has been given the silicone treatment of this invention can generally be predetermined to some extent by measuring the reduction in water absorption of the silicone-treated paper as determined by the Cobb test, described below. As water absorption by the silicone-treated paper is decreased, inhibition of stratification usually increases. Furthermore, as the amount of silicone used in the treatment increases, water absorption decreases and as a result inhibition of stratification increases.

The Cobb test follows the general test outlined by T.A.P.P.I., but is modified as follows: In conducting this test, a 5″ x 5″ sample of the paper to be tested is conditioned at 150° F. for 20 minutes and cooled in a desiccator. Upon removal from the desiccator, it is weighed rapidly on a balance to the nearest 0.01 gm. This is the "dry weight." The sample is then clamped in a standard 100 sq. cm. Cobb ring (manufactured by W. and L. E. Gurley Instrument Co.) having an area of 100 square centimeters with the paper surface to be tested exposed. The Cobb ring is pre-heated to 100–120° F. prior to conducting the test in order to prevent rapid cooling of the test water. 150 ml. of clean tap water at 120° F. is then poured into the Cobb ring, covering the surface of the paper sample to be tested. A timer is started as soon as the water is poured into the ring. After the water has been in contact with the paper for exactly 3 minutes, the water is poured out of the ring. As rapidly as possible, the paper sample in removed from the ring, blotted "dry" of surface water with a highly absorbent blotter or paper towel, folded into quarters to reduce weight loss from evaporation, and reweighed to the nearest 0.01 gm. This is the "wet weight." (This last sequence of steps should not exceed 15–30 seconds). The Cobb value is determined by subtracting the "dry weight" from the "wet weight."

It is desirable to have a Cobb value for the silicone-treated paper cover sheet at the time the gypsum board is manufactured of about 0.4 to about 1.0 gram, and more preferably about 0.4 to 0.7 gram, as measured on the surface of the paper cover sheet adjacent the gypsum core.

It is desirable that the side of the paper cover sheet adjacent the gypsum core contain cured hydrophobic silicone, and for that reason it is expedient to treat the core-side of the paper cover sheet, as described in greater detail hereinbelow. It should be understood, however, that the paper cover sheet may contain the hydrophobic silicone through a substantial depth thereof and that several or all plies of the sheet may contain the silicone. The paper cover sheet can contain the cured hydrophobic silicone in the space from the surface of the paper sheet adjacent the gypsum core to a location displaced inwardly of the paper from said surface, which may include up to the thickness of the sheet. For example, in the manufacture of multi-ply paper cover sheet on a cylinder paper-making machine, the bond ply adjacent the gypsum core may be treated in accordance with this invention either alone or in combination with one or more of the filler plies and/or the top liner. When the silicone is applied to the bond ply of the paper cover sheet as by means of a roller applicator at the calender stack, described below in greater detail, the bond ply and adjacent filler ply or plies, generally about 2 to 4 of the adjacent filler plies, are found to contain silicone.

The hydrophobic organo-silicone may be impregnated or incorporated into the paper cover sheet in numerous ways, i.e., spraying, brushing, flooding, rolling or adding the silicone to the furnish for the paper. After the paper cover sheet is treated, the hydrophobic silicone is cured to effect cross linking. The rate of cure will differ for each specific hydrophobic silicone, and the curing rate is affected by such factors as temperature, time and total acidity of the paper-making system. For this reason, it usually is expedient to treat the paper cover sheet with the hydrophobic silicone during the course of manufacture of the paper, whereby the elevated temperatures employed in the calendering stage will effect, to some degree, curing of the silicone. Regardless of the rate of cure, it is important that the hydrophobic silicone incorporated in the paper cover sheet be substantially cured prior to the manufacture of the gypsum board.

Where desired, the rate of cure of the hydrophobic silicone incorporated in the paper may be accelerated by the use of suitable catalysts. A number of catalysts are known and available which will effect the cross linking of the hydrophobic silicone treating agent. Suitable catalysts include the metal salts of organic acids, for example, lead, iron, zinc, copper, aluminum, magnesium, cadmium, cobalt, nickel, tin and sodium salts of acetic, octoic, oleic, stearic, naphthenic, lauric and resin acids, or mixtures thereof. These metal salts might include a dialkyl methyl diester of an organic acid, such as dibutyl tin dilaurate, dibutyl tin diacetate, dibutyl tin di-2-ethyl hexoate, and the like.

The hydrophobic silicone can be employed in the treatment of the paper cover sheet in undiluted form, but it is preferable to use a solution or aqueous emulsion in order to more readily control the amount applied. Aqueous emulsions of the hydrophobic silicone are preferred, and can be prepared in conventional manner with conventional emulsifying agents. Quaternary ammonium salts, the higher aliphatic alcohol sulfates, or polyoxyethylene derivative of polyhydric alcohols are typical emulsifying agents which can be used. These include, for example, cationic agents such as N-cetyl-ethyl morpholinium etho sulfate, or n-alkyl trimethyl ammonium chlorides; anionic agents such as lauryl alcohol sulfate; and nonionic agents such as nonyl phenyl polyethylene glycol ether, polyoxyethylene sorbitan monolaurate, and polyoxyethylene cetyl ether. Certain of these emulsions may be unstable, such as the methyl hydrogen silicone emulsion which tends to eliminate hydrogen on standing. This condition may be avoided by adding an organic acid, such as acetic acid, to the emulsion in order to inhibit the evolution of silane hydrogen.

The hydrophobic silicone, preferably as an aqueous emulsion, is applied to or incorporated in the paper cover sheet for gypsum board in any one of a number of ways. Where desired, the hydrophobic silicone may be applied to the paper in conjunction with a suitable curing resin. The methods of application include, for example, the following:

(1) Separate spray, flooding or roller application of the hydrophobic silicone to the paper web at the dryer section of the paper-making process.

(2) Separate spray, flooding or roller application of the hydrophobic silicone to the paper web as it is formed at the cylinders or on a fourdrinier wire of the paper machine.

(3) Continuous addition of the hydrophobic silicone to the paper furnish at one or more plies prior to forming on the paper-making machine.

It is to be understood that these methods of application are illustrative, and other techniques will be apparent to those skilled in the art to which this invention pertains. A suitable curing catalyst may be applied to the paper by the same or different technique from that used in applying the hydrophobic silicone; and the catalyst may be applied shortly before, simultaneous with, or after the addition of the hydrophobic silicone to the paper. For example, the hydrophobic silicone may be applied to the paper by roller application at the dryer section of the papermaking process, and thereafter the catalyst may be applied by spraying with a suitable nozzle. As a further illustration, the catalyst may be added continuously to the paper furnish for one or more of the plies prior to forming on the paper-making machine, and thereafter applying the hydrophobic silicone to the paper stock prior to the formation or after formation of the paper web.

The amount of cured hydrophoric slicone incorporated in the paper is and should be sufficient to effect the objectives of this invention. This amount will depend primarily upon operating conditions such as machine speeds, composition of the paper, nip pressure or doctor blade adjustment where flooding or roller applications are used, spray conditions where employed, as well as temperature, viscosity and composition of the silicone compound. Generally, about 0.1 to 4 pounds of cured hydrophobic silicone solids per ton of paper treated on one side will give satisfactory results, and more preferably about 0.2 to 2 pounds, for a conventional wallboard multi-ply cover sheet typically having a thickness of about 0.020 inch. Where an amount less than 0.1 pound is used, the desired qualities are to some extent reduced. On the other hand, generally there is no additional benefit in employing more than 4 pounds of silicone solids.

When a catalyst is used for curing the hydrophobic silicone, the amount employed will depend in part upon the time required to promote cure before the paper is used in making gypsum board. The rate of cure normally can be accelerated by increasing the amount of catalyst, such that where the time lapse between the paper manufacture and gypsum board manufacture is at a minimum, greater amounts of catalyst can be used than where there is a substantially longer time lapse. About 0.1 to about 3 pounds of catalyst solids per tone of treated paper will give effective results, but greater or lesser amounts can be used.

Curing times sufficient to provide the desired cure or cross linking of the hydrophobic silicone are used. For example, there was applied to the paper cover sheet at the surface of the bond ply or core-side ply 0.5 pound of a methyl hydrogen polysiloxane having the general structural formula:

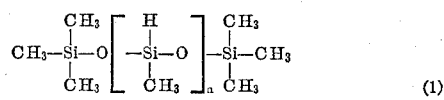

(1)

wherein $n$ has an average value of from 30 to 35. Dibutyltin diacetate, as catalyst, and the silicone were applied to the paper at the calendering operation where the temperature ranged from a high of about 225° F. to a low of 135° F., and curing of the compound was substantially effected in the paper stored at room temperature after 12 hours. Under the same operating conditions but without catalyst, 0.5 pound of epoxy silicone applied to the paper was cured after 10 days. When the catalyst was employed with the epoxy silicone, curing was complete after about 2 to 3 hours.

As explained above, the rate of cure may be increased by adjusting certain factors in the paper-making procedure, such as increasing the temperature at which the cure is being carried out, adjusting the total acidity of the paper-making system or by the use of a catalyst. The extent of cure can be evaluated by the Cobb value of the paper after a given elapsed time. The cured silicone present in the paper reduces water absorption by the paper, as determined by the Cobb test, and the more silicone cured at the time the board is manufactured, the more the water absorption is decreased thereby increasing inhibition of stratification.

There is illustrated schematically in the drawing a technique for applying the hydrophobic silicone to the paper cover sheet. There is shown the calender section of a conventional multi-cylinder paper-making machine. Prior to being dried, the multi-ply sheet 10 is assembled into a laminated sheet by forming a plurality of plies which are subsequently laminated after being passed through the press part of the machine (not shown). The finished paper cover sheet 10, which is generally seven, eight or nine ply, consists of a bottom liner ply or bond ply which is in contact with the gypsum core, a top liner ply which is the exposed ply and several filler plies. Thereafter, sheet 10 is passed through a high temperature dryer (not shown), and then over a wet calender stack of rolls 11 and further calendered by passing the sheet 10 over a dry calender stack of rolls 12 typically at a speed of about 300 to 500 feet per minute depending primarily upon the weight of paper being manufactured. After leaving the calender section, sheet 10 is further processed into the final cover sheet which is then used as a component of the gypsum wallboard. The paper is heated upon passing through the high temperature dryer which in turn heats the calender rolls, and illustrative temperatures for the paper and calender rolls are shown in the drawing.

The hydrophobic silicone can be applied at the calender section by means of applicator troughs 13 and 14 by either applying the curing catalyst at the bottom roll of the wet calender stack, or alternatively, applying the hydrophobic silicone at the bottom roll of the wet calender stack and the curing catalyst at the bottom roll of the dry calender stack. Where desired, the catalyst may be omitted, and in that case it is desirable to apply the hydrophobic silicone at trough 13.

The applicator troughs 13 and 14 are used to flood the paper with the required amount of hydrophobic silicone and catalyst. A suitable feeding technique (not shown) is utilized to insure that the applicator troughs 13 and 14 remain full during the application of the hydrophobic silicone and catalyst to the surface of the bond ply of the paper cover sheet. By this means, the hydrophobic silicone, and catalyst when used, are applied substantially uniformly to the surface of the paper. The paper is impregnated with the silicone composition, and in a typical operation, approximately half of the silicone is present in the bond ply, and over half of the silicone is present in the bond ply and the filler ply immediately adjacent thereto. Minor amounts of silicone are present in the next one or two adjacent filler plies. For example, in an operation such as described in Example 1 below, about 50% silicone was found in the bond ply, about 25% in the ply adjacent thereto, about 12% in the next adjacent ply and lesser amounts in the next two adjacent plies. This, of course will vary depending on dilution of the silicone, the extent of rosin sizing, and other factors.

The treated paper and gypsum slurry are integrated at the board plant, and the formed board, cut to desired lengths, is passed through a drying kiln. In the manufacture of a ⅜ inch board, for example, using paper treated with an epoxy silicone or with the silicone of Formula 1, the board passes first through a high temperature zone of about 400–550° F., then through an intermediate zone of about 350–450° F., and then through a dry end zone of about 200–300° F., which typically takes about 50 to 70 minutes.

In addition to minimizing stratification, other attendant advantages of the instant invention include the production of high quality gypsum board employing substantially lesser amounts of starch in the gypsum core than normally utilized. It was found that by reason of our invention as much as 40–80% savings in the amount of starch was realized without impairing overall board quality. For example, one production facility which previously required about 12 pounds of starch per thousand square feet of paper cover sheet for ½ inch wallboard was able to reduce starch usage to about 5 pounds per thousand square feet for the same wallboard, when using paper treated in accordance with this invention. Another facility with somewhat different board producing equipment and operating conditions previously required 9 pounds of starch per thousand square feet of paper cover sheet for ½ inch wallboard, and in using paper treated by this invention has run as low as 2 pounds of starch per thousand square feet for the same size wallboard. As is known in the art, the amount of starch used in the gypsum core depends on a number of factors including, for example, gypsum rock purity, manufacturing speeds, versatility of drying facilities, etc., and this generally is true with respect to wallboard manufactured according to conventional procedures as well as that manufactured according to our invention.

As a still further advantage of this invention, the conventional size with rosin and alum may be generally omitted from one or more plies. For example, when the core side surface of the paper cover sheet is treated as by roller application with a silicone compound in accordance with this invention, the rosin-alum sizing can be omitted from the bond ply and one or more of the filler plies, preferably the filler ply immediately adjacent the bond ply. In such a case, it is desirable that no rosin-alum sizing be used in the paper cover sheet to a thickness of about 0.008–0.011 inch of the paper as measured from the outer surface of the bond ply to the filler plies. The reason for this is that papers exhibiting low bottom Cobb, e.g., paper being relatively nonabsorptive, can result in loss of wet bond of the paper to the core at the knife when cutting the wet endless board into required lengths. Wet bond is the phenomina where when the paper is pulled from the core of the board prior to drying, the paper has become sufficiently wet such that the fiber bond is weakened sufficiently to permit the paper to tear apart thus leaving some paper adhered to the wet core. In making a gypsum wallboard in accordance with the invention, the rosin-alum sizing is omitted from the bond ply and can also be omitted from one or more of the filler plies as described in order to attain the desired wet bonding at the board plant knife. As a result, considerable savings in rosin-alum sizing are realized.

The silicone-containing compounds suitable for treating the paper cover sheet for gypsum wallboard in accordance with the process of our invention are those compounds which can be termed curable hydrophobic silicones, and include both monomeric and polymeric species, i.e., the silanes and siloxanes having these two properties. Suitable monomeric silicone compounds as being typical for use in the invention are the silane esters such as acyloxysilanes, the alkoxy silanes, the water hydrolyzable silanes such as methyl sodium silanolates, and the well known alkylchlorosilanes such as dimethyldichlorosilane.

Illustrative of the acyloxysilanes are octadecoxy-dodecoxy-propoxy silicone acetate, di-octadecoxy-propoxy-silicone acetate, tridodecoxy silicone formate, etc. Methods for preparation of these esters can be found in United States Patent 2,405,988.

Alkoxy silanes found suitable include, for example, ethoxysilane, diethoxysilane, dimethoxydichlorosilane and diethoxydifluorosilane. Suitable alkylchlorosilanes include, for example, dimethyldichlorosilane, ethyltrichlorosilane, and the like.

Suitable curable hydrophobic silicone compounds include also the isocyanato modified silanes and siloxanes. Examples include isocyanatophenyl(methyl)dichlorosilane, isocyanatophenyltrichlorosilane, isocyanatophenyldimethylchlorosilane, beta - isocyanatophenylethyldiethoxyfluorosilane, delta-isocyanatobutyl(methyl)difluorosilane, gamma-isocyanatopropyl(butoxy)dichlorosilane, and isocyanatocyclohexyldifluorosilane, and siloxanes shown in the following formulae:

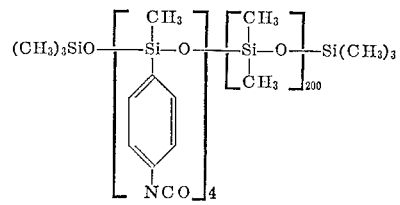

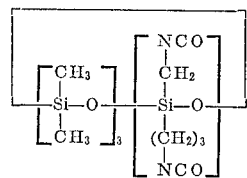

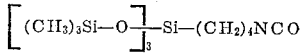

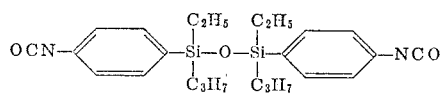

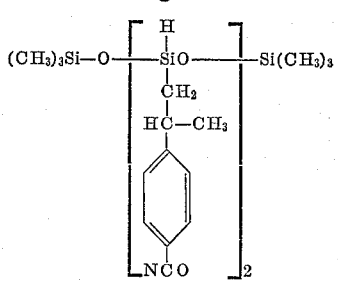

Further descriptions of such suitable compounds are set forth in United States Patents 3,179,622, 3,179,713 and 2,924,587.

The organohydrogensiloxanes of the polymeric type found useful for treating the paper cover sheet for gypsum board have as a general unit formula, for example:

$$R_aSiH_bO_{\frac{4-a-b}{2}} \quad (2)$$

wherein R is a monovalent hydrocarbon radical, $a$ is a number having a value from 0 to 1 inclusive, $b$ is a number having a value from 1 to 2 inclusive, and the sum of $a+b$ has a value of from 1.5 to about 2. Such organohydrogensiloxanes can be hydrocarbylhydrogen-siloxanes or copolymers of hydrocarbyl siloxanes with dihydrogensiloxanes. The monovalent hydrocarbon radicals represented by R in the above Formula 2 are illustrated by alkyl groups, such as methyl, ethyl, propyl, isopropyl, butyl, isobutyl, amyl, hexyl and the like; aryl groups, such as phenyl, naphthyl and the like; alkaryl groups, such as tolyl, ethylphenyl, xylyl, mesityl and the like; aralkyl groups, such as benzyl, phenylethyl and the like; alkenyl groups, such as vinyl, allyl, and the like; and alicyclic groups, such as cyclopentyl, cyclohexyl and the like. More desirably, R is an alkyl group, and in the preferred embodiment R is a methyl group. The organohydrogensiloxanes of the above Formula 2 can be cyclic polymers consisting generally of from 3 to 7 organohydrogensiloxane units or they can be substantially linear polymers end-blocked with triorganosilyl units, hydroxyl groups or alkoxy groups, for example. Such substantially linear polymers generally have chain lengths such as to provide viscosity values of from about 10 to about 1,000,000, preferably from about 15 to 200, centistokes at 25° C. Preferably, the organohydrogensiloxane is a methylhydrogensiloxane having a viscosity value of from about 15 to about 50 centistokes at 25° C.

The organohydrogensiloxanes of greatest utility should contain from about 0.04 to about 1.7 weight percent silanic hydrogen. The organohydrogensiloxanes having the above Formula 2 and containing silanic hydrogen can also be combined as a copolymer or blend, for example, with organosiloxanes of the unit formula:

$$R_cSiO_{\frac{4-c}{2}} \quad (3)$$

wherein R is defined above for Formula 2 and $c$ is a number from 1 to 3, inclusive. The organosiloxanes of the above Formula 3 can be cyclic polymers consisting generally of from 3 to about 7 siloxane units or they can be substantially linear polymers end-blocked with triorganosilyl units, hydroxyl groups or alkoxy groups, for example. They can be end-blockers for siloxanes of Formula 2 or they can be trifunctional resin-like materials. These organosiloxanes resulting from a copolymer or blend of materials having Formulas 2 and 3 should contain from about 0.04 to about 1.7 weight percent silanic hydrogen. The epoxy silicones, also of a polymeric type, found suitable for this invention have, for example, a general unit formula:

$$MD_xU_yM'_q \quad (4)$$

wherein D represents an $R_2SiO$ unit in which R is a monovalent hydrocarbon radical free of acetylenic unsaturation; U represents an $$\begin{array}{c} R' \\ | \\ R-SiO \end{array} \text{ or } R'SiO_{3/2}$$

unit in which R is a monovalent hydrocarbon radical free of acetylenic unsaturation; R' is a monovalent organic radical containing at least one vicinal epoxy $$\begin{array}{c} O \\ / \backslash \\ -C \underline{\quad} C- \\ | \quad | \end{array}$$

group; and M and M' are in each occurrence the same or different end-blocking unit having the formula:

$$\begin{array}{c} R' \\ | \\ R''_{3-a}SiO_{a/2} \end{array}$$

in which R'' is a monovalent hydrocarbon radical free of olefinic unsaturation, preferably an alkyl group containing from 1 to 6 carbon atoms or a hydrocarbyloxy radical in which the hydrocarbyl moiety is free of olefinic unsaturation and is preferably an alkoxy group containing from 1 to 10 carbon atoms or M and M' can be alkoxy radicals. R' is a monovalent organic radical containing a vicinal epoxy $$\begin{array}{c} O \\ / \backslash \\ (-C \underline{\quad} C-) \\ | \quad | \end{array}$$

group; $a$ has a value from 0 to 1 inclusive; $q$ has a value of 1 when $U=RR'SiO$ and $y+1$ when $U=R'SiO_{3/2}$; $x$ is an integer having a value of from 10 to about $10^5$; $y$ is an integer having a value of from 1 to about $10^2$; the sum of $x$, $y$, and $q$ being such that the silicone compound $MD_xU_yM'_q$ has a molecular weight of from about $10^3$ to about $10^6$ and the ratio of epoxy-containing units to units containing no epoxy groups is within the range of from about 0.001 to 0.5, preferably from about 0.01 to about 0.25. Illustrative of the monovalent hydrocarbon radicals represented by R'' in the $$R_2SiO_{1/2} \text{ and } \begin{array}{c} R' \\ | \\ R-SiO_{1/2} \end{array}$$

units defined above for U are alkyl groups containing from 1 to 10 carbon atoms, more preferably 1 to 6 carbon atoms, such as methyl, ethyl, propyl, butyl, isobutyl, amyl, hexyl, octyl, and decyl; alkenyl groups such as vinyl, allyl, butadienyl, and 1-pentenyl; aryl radicals including fused ring structures such as phenyl, p-phenylphenyl, naphthyl, anthryl and the like; alkaryl radicals such as tolyl, xylyl, p-vinylphenyl, and B-methylnaphthyl; aralkyl radicals such as stearyl, phenyl-methyl and phenyl-cyclohexyl; and cycloalkyl radicals such as cyclopentyl, cyclohexyl and cyclobutyl. Preferably, R is an alkyl radical, and more especially a methyl radical. The monovalent organic radicals represented by R' which contain epoxy groups are, exclusive of the oxirane oxygen necessarily present, preferably hydrocarbon radicals free of acetylenic unsaturation or containing in addition to carbon and hydrogen only ether or carbonyl oxygen. Such R' radicals include 3,4 - epoxycyclohexyl; 6 - methyl - 3,4-epoxycyclohexyl; 3-oxatricyclo [3.2.1.0$^{2,4}$]octane - 6 - propyl; 7-butyl-3-oxatricyclo [3.2.1.0$^{2,4}$]octane-6-methyl; 3,4-epoxycyclohexyl-1-ethyl; 9,10-epoxystearyl; 8-glycidoxypropyl; p(2,3-epoxybutyl) phenyl; and 3-(2,3-epoxy-butyl) cyclohexyl. The vicinal epoxy group can be, but need not be, a terminal group of the R' radical. Moreover, the R' radical can be simply a $$\begin{array}{c} H \quad O \\ | \quad / \backslash \\ -C \underline{\quad} CH_2 \end{array}$$

radical directly joined to silicone.

Additional illustrations of suitable epoxysilicones are set forth in the "Journal of the American Chemical Society," vol. 81, pages 2632–2635 (June 5, 1959). A still further silicone compound which may be employed in treating the paper cover sheet is an addition product of a hydrosilicone compound with a fatty acid ester containing, for example, at least one unsaturated carbon-to-carbon bond, wherein the addition product contains from about 0.2–85% silicone. Preferred fatty acid esters are drying oil and semi-drying oil. The preferred addition products have the following general unit formula:

where R' is a monovalent hydrocarbon group, $x$ has a value of from 0 to 60, and $y$ has a value of from 1 to 60.

The following examples further illustrate our invention:

Example 1

In treating the paper cover sheet in accordance with this invention, a methyl hydrogen polysiloxane having the general structure shown in Formula 1 was used. This polysiloxane is a fluid having a specific gravity at 25° C./25° C. of about 1.01 to 1.02, a viscosity of from 20 to 40 centistokes and has the appearance of a clear liquid. An emulsion of this polysiloxane was prepared employing 40% by weight of the polysiloxane, 7½% of a conventional emulsifier (a polyoxyethylene derivative of polyhydric alcohols), and about 52.5% by weight of water. The emulsion was prepared using conventional emulsion forming techniques. An aqueous emulsion of dibutyl tin dilaurate (37.5% by weight) was employed as the curing catalyst. Applicator troughs were placed at the bottom nip of the wet calender stack to effect the treating of the bottom liner ply. The methyl hydrogen siloxane was applied at the applicator trough at the dry calender stack and the curing catalyst was applied by means of the applicator trough located at the wet calender stack. The hydrophobic silicone emulsion was diluted to apply 1.5 pounds of solids per ton of paper. Similarly, the curing catalyst emulsion was diluted to permit .7 pound of catalyst per ton of paper to be applied. The treated paper had Cobb values after being cured for 24 hours at 90–105° F. of about 0.4–0.6 gram. The treated paper cover was employed in manufacturing ⅜ inch thick gypsum wallboard. A conventional gypsum slurry was used in preparing the core with the exception that the core contained only about 0.4% by weight of starch, which is a clear reduction from conventional requirements of about 0.8% by weight. In addition, the rosin-alum size was omitted from the bond ply and the adjacent filler ply thereto, thereby resulting in a second substantial savings.

Comparative tests of gypsum wallboards were run where the wallboards were subject to humidification for 18 hours at 90° F. and 90% relative humidity. Wallboard using paper cover sheet not treated in accordance with this invention had as much as 68% film peeling on the face and 100% film peeling on the back; whereas wallboard using paper cover sheet treated as above had substantially no peeling on the face or back evidencing excellent paper to core bond at substantially 100%.

Example 2

In this example of treating the paper cover sheet in accordance with this invention, there was used an epoxy silicone polymer having the average formula as:

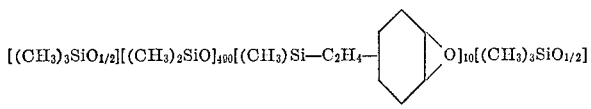

This epoxy silicone is a fluid having a specific gravity at 25° C./25° C. of between about 0.99 to 1.0. An emulsion of this epoxy silicone was prepared by employing 40% by weight of the silicone. The epoxy silicone was applied to the bottom liner ply of the paper cover sheet at the bottom nip of the wet calender stack. No catalyst was employed in this application. The epoxy silicone emulsion was diluted to apply 0.5 pound of solids per ton of paper. The treated paper had Cobb values after being cured for 10 days at room temperature of about 0.4 to 0.6 gram. The paper was used in the manufacture of ½ inch gypsum wallboard, and the resulting board evidence 100% paper to core bond. Here again, there was about a 50% reduction in starch usage, and no rosin-alum sizing was employed in the bond ply and the filler ply immediately adjacent the bond ply.

Example 3

A paper cover sheet was made in accordance with this invention using an addition product of a hydrosilicone compound with a fatty acid ester having the general structure shown in Formula 5. The addition product was applied to the bond ply of the paper cover sheet by roller application in an amount of 0.8 pound of solids per ton of paper and no catalyst was employed. The paper was cured at 75° F. for 5 days, and rendered a Cobb value of 0.7 gram. The treated paper was employed in making ½ inch wallboard by a batch type method. Here again, the board evidenced 100% paper to core bond at a substantial reduction in the quantity of starch used in the gypsum core, and no rosin-alum sizing was employed in the bond ply and the three filler plies adjacent the bond ply.

Although the foregoing invention has been described with reference to illustrative embodiments and other details of the invention, it is apparent that variations and modifications can be carried out without departing from the scope of this invention. Accordingly, the invention is defined by the scope of the appended claims.

What is claimed is:

1. Paper-covered gypsum board which comprises a gypsum core and a paper cover sheet covering at least one side of said core, said paper cover sheet having a cured hydrophobic organo-silicone in an amount sufficient to attain in said sheet, when said board is manufactured, a Cobb value of about 0.4 to 1.0 gram measured on the surface of said sheet adjacent said core.

2. A paper-covered gypsum board according to claim 1 wherein said Cobb value is from about 0.4 to 0.7 gram.

3. A paper-covered gypsum board in accordance with claim 1 wherein said sheet contains 0.1 to 4 pounds of said hydrophobic silicone per ton of said sheet.

4. A paper-covered gypsum board in accordance with claim 1 wherein said sheet contains 0.2 to 2 pounds of said hydrophobic silicone per ton of said sheet.

5. A paper-covered gypsum board according to claim 1 wherein said cured hydrophobic silicone is selected from the group consisting of organohydrogen siloxanes, epoxy silicones and the addition products of hydrosilicone with a fatty acid ester.

6. A paper-covered gypsum board in accordance with claim 1 wherein said paper cover sheet is a multi-ply paper cover sheet and the space from the surface of said sheet adjacent said gypsum core to a location displaced inwardly of said sheet from said surface contains said cured hydrophobic silicone.

7. A paper-covered gypsum board in accordance with claim 6 wherein the bond ply of said multi-ply paper cover sheet contains substantially no rosin and alum sizing compound.

8. A method of making paper-covered gypsum board which comprises forming a core of cementitious gypsum slurry, laminating said core with a paper sheet containing a cured hydrophobic silicone in the space from the surface of said sheet placed adjacent said gypsum core to a location displaced inwardly of said sheet from said surface in an amount sufficient to attain in said paper cover sheet a Cobb value of about 0.4 to 1.0 gram as measured on the surface of said sheet adjacent said core and drying said gypsum board.

9. A method according to claim 8 wherein said hydrophobic silicone is selected from the group consisting of organohydrogensiloxanes, epoxy silicones, and the addition products of a hydrosilicone with a fatty ester.

10. A method according to claim 9 wherein said cured hydrophobic silicone is an organohydrogensiloxane.

11. A method according to claim 9 wherein said cured hydrophobic silicone is an epoxy silicone.

12. A method of making a paper-covered gypsum board which comprises applying a hydrophobic silicone to a paper cover sheet for gypsum board at the zone adjacent the gypsum, said hydrophobic silicone selected from the group consisting of organohydrogensiloxane, epoxy silicone and the addition product of a hydrosilicone with a fatty acid ester, curing said hydrophobic silicone, forming a core of cementitious gypsum slurry, laminating said core with a paper cover, and drying said gypsum board, the cured hydrophobic silicone being present in an amount sufficient to attain in said paper cover sheet a Cobb value of about 0.4 to 1.0 gram as measured on the surface of said sheet adjacent said core.

13. A method of making a paper-covered gypsum board which comprises forming a paper cover sheet, applying to at least one side of said sheet a hydrophobic silicone, curing said hydrophobic silicone, forming a core of starch-containing cementitious gypsum slurry, laminating said core and said sheet with a side of said sheet having said hydrophobic silicone applied thereto in contact with said core to produce a gypsum board, and drying said gypsum board, the amount of said cured hydrophobic silicone being sufficient to attain in said sheet a Cobb value of about 0.4 to 1.0 gram as measured on the surface of said sheet adjacent said core.

14. A method of making a paper-covered gypsum board which comprises forming a multi-ply paper cover sheet and calendering said resulting sheet, applying a hydrophobic silicone to at least one surface of said sheet during said calendering, said hydrophobic silicone selected from the group consisting of organohydrogensiloxane, epoxy silicone and the addition product of a hydrosilicone with a fatty acid ester, curing said hydrophobic silicone applied to said sheet, forming a core of starch-containing cementitious gypsum slurry, laminating said core and said sheet with a side of said sheet having said hydrophobic silicone applied thereto in contact with said core to produce a gypsum board, and drying said gypsum board, the amount of said cured hydrophobic silicone being sufficient to attain in said paper a Cobb value of about 0.4 to 1.0 gram as measured on the surface of said sheet adjacent to said core.

15. A method according to claim 14 wherein the amount of said cure hydrophobic silicone is from 0.1 to 4 pounds per ton of paper.

16. A method according to claim 14 wherein said hydrophobic silicone applied to said sheet is cured with a catalyst.

17. A method according to claim 14 wherein said hydrophobic silicone is a methyl hydrogen polysiloxane.

18. A method according to claim 14 wherein said hydrophobic silicone is epoxy silicone.

References Cited
UNITED STATES PATENTS

| | | | |
|---|---|---|---|
| 2,342,462 | 2/1944 | Farmer et al. | 156—44 X |
| 2,352,553 | 6/1944 | Lefebure | 156—41 |
| 2,560,521 | 7/1951 | Camp | 156—41 |
| 2,774,690 | 12/1956 | Cockett et al. | 260—448.2 |
| 2,806,811 | 9/1957 | Von Hazmburg | 156—39 X |
| 3,227,579 | 1/1966 | Bluestein | 117—161 |
| 2,785,067 | 3/1957 | Osberg | 162—158 |
| 3,307,987 | 3/1967 | Bieri | 156—41 |

EARL M. BERGERT, *Primary Examiner.*

T. R. SAVOIE, *Assistant Examiner.*